United States Patent [19]

Ogata et al.

[11] Patent Number: 4,977,500
[45] Date of Patent: Dec. 11, 1990

[54] SYSTEM RECOVERY METHOD FOR COMPUTER SYSTEM HAVING A STANDBY SYSTEM WITH A WAIT JOB OPERATION CAPABILITY

[75] Inventors: Hiromichi Ogata, Fujisawa; Youichi Yamamoto, Kawasaki, both of Japan

[73] Assignee: Hitachi, Ltd., Tokyo, Japan

[21] Appl. No.: 97,123

[22] Filed: Sep. 16, 1987

[30] Foreign Application Priority Data

Sep. 9, 1986 [JP] Japan .................. 62-219542

[51] Int. Cl.⁵ .................................. G06F 11/16
[52] U.S. Cl. .................... 364/200; 371/12; 364/268
[58] Field of Search ... 364/200 MS File, 900 MS File; 371/12

[56] References Cited

U.S. PATENT DOCUMENTS

| | | | |
|---|---|---|---|
| 3,377,623 | 4/1968 | Reut et al. | 340/172.5 |
| 3,623,014 | 11/1971 | Doelz et al. | 340/172.5 |
| 4,257,097 | 3/1981 | Moran | 364/200 |
| 4,306,288 | 12/1981 | Nakamura | 364/200 |
| 4,589,093 | 5/1986 | Ippolito et al. | 364/900 |
| 4,648,031 | 3/1987 | Jenner | 364/200 |
| 4,674,038 | 6/1987 | Brelsford et al. | 364/200 |
| 4,703,481 | 10/1987 | Fremont | 371/12 |

FOREIGN PATENT DOCUMENTS 0062463 3/1982 European Pat. Off. .
243464 12/1925 United Kingdom .

*Primary Examiner*—Raulfe B. Zache
*Attorney, Agent, or Firm*—Antonelli, Terry, Stout & Kraus

[57] ABSTRACT

In an online system having processors which execute a plurality of online jobs, a standby processor is provided along with a wait job which is executed by this processor and which has organization information of a logical sum of organization information items of the plurality of online jobs. When a failure has occurred as to any of the online jobs, only the organization information item of the failed online job within the organization information of the wait job is left valid. Thereafter, a process of the failed online job is switched to and executed by the wait job.

4 Claims, 6 Drawing Sheets

SYSTEM RECOVERY METHOD FOR COMPUTER SYSTEM HAVING A STANDBY SYSTEM WITH A WAIT JOB OPERATION CAPABILITY

BACKGROUND OF THE INVENTION

1. Field of the Invention

The present invention relates to an information processing system, and more particularly to a system recovery method according to which, when an error has developed in a job being online-processed in a certain CPU, the online operation is adapted to continue with a job to be online-processed waiting in another CPU.

2. Description of the Prior Art

As described in "Hot Standby Processing System," 4B-12XDM(10), Preliminary Abstracts of the 32nd (First Term of 1986) National Meeting of the Japan Society of Information Processing, a prior-art system recovery method of the hot standby type is a control method wherein a standby computer is installed as the backup of online computers, and at the time of any failure of the online computer (the failure of a CPU, an operating system, a DB (data base function)/DC (data communication function) or the like, a job having been online-processed is changed to a job to be online-processed waiting in another CPU, thereby to continue the online operation in a moment. Since, however, the wait job for continuing the online operation at the failure is prepared as the backup of the online job for online processing, the online job and the wait job are in the relation of one-to-one correspondence. Accordingly, in a data processing system in which a plurality of online jobs exist, a plurality of wait jobs are correspondingly required, and hence, the wait jobs which are not processed ordinarily except at the failures necessitate a large number of resources such as memories, CPU's and magnetic disk devices. This point is not taken into consideration.

The prior art mentioned above does not take into account the corresponding number of wait jobs in the presence of the plurality of online jobs, and it has the problem that the resources of the information processing system are needed in large quantities because the plurality of existent wait jobs occupy the resources such as memories, CPU's and magnetic disk devices, respectively.

SUMMARY OF THE INVENTION

An object of the present invention is to reduce the number of wait jobs and thus curtail the amount of resources which are occupied by the wait jobs, thereby to decrease the resources of the overall information processing system and to recover the system from failures efficiently.

The object of the present invention is accomplished in such a way that a standby system to cope with an online failure is provided with a wait job which performs a recovery process in a moment at the failure, that the wait job is endowed with the organization information of the logical sum of the organizations of a plurality of online jobs, and that at the time of the online failure, the organization information except the organization of the failed online job is invalidated, whereupon the a failed processor is replaced with the standby system.

According to the present invention, the single wait job can stand by a certain failed one of a plurality of online jobs, and the number of wait jobs can be reduced.

DESCRIPTION OF THE PREFERRED EMBODIMENTS

Figure 1:
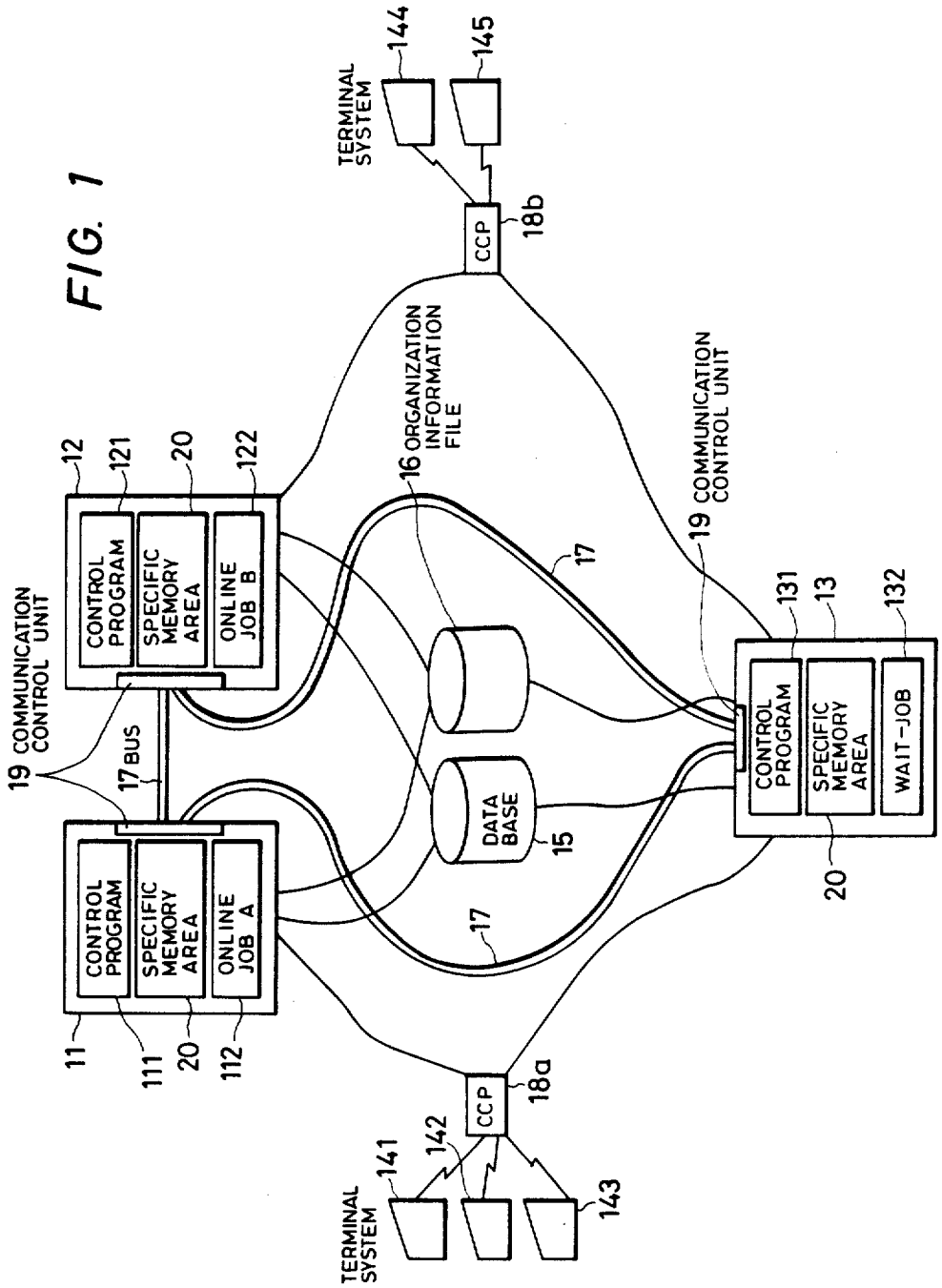
FIG. 1 is an architectural diagram of an online system in an embodiment of the present invention.

Now, an embodiment of the present invention will be described with reference to FIGS. 1 thru 4. FIG. 1 is an architectural diagram of an online system according to the present invention. The online system is a data processing system including an online computer 11, an online computer 12, and a standby computer 13 with which the online computer is replaced when the online computer has failed. The computer systems are interconnected by a channel-to-channel adapter (CTCA) (composed of a bus 17 and communication control units 19). The CTCA is described in Japanese Patent Application Laid-open No. 32151/986. In the respective computer systems, there are control programs 111, 121 and 131 which control the switching of the computer systems. A data base 15 is stored in a magnetic disk device accessible from the respective computer systems, while the organization information of online jobs concerning the respective computer systems is stored in an organization information file 16. The "organization information" is information on the connections of terminal devices, peripheral devices, etc. The online computer 11 and online computer 12 include online job A (112) and online job B (122) and process them, respectively. The content of the online job A is to execute an online process using the data base 15 in the state in which terminal systems 141, 142 and 143 are connected through a CCP (communication control processor) 18a. The content of the online job B is to execute an online process using the data base 15 in the state in which terminal systems 144 and 145 are connected through a CCP 18b. The connected situations of the terminal systems and the access information of the data base are stored in the organization information file 16 as the organization information items of the online job A and the online job B.

By way of example, the online system is a bank online system, and the online jobs A and B perform various transactions of a bank.

The online job A processes the transactions issued from terminal devices installed in a certain area, while the online job B supports another area.

Here, the setup of the organization information file 16 will be described.

Figure 5:
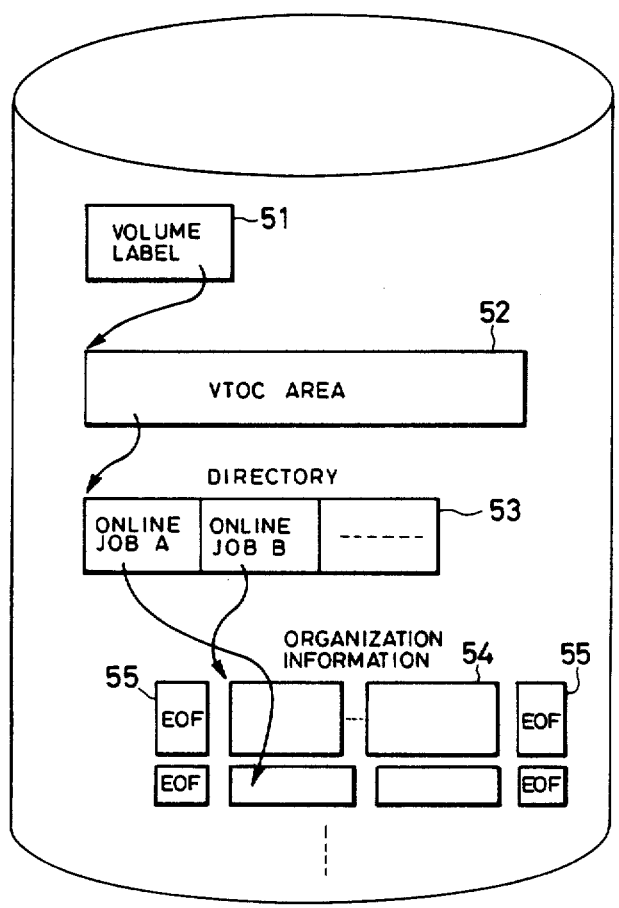
FIG. 5 is a setup diagram of an organization information file.

FIG. 5 shows a recorded example of the organization information. The organization information is prepared on a direct access volume as a partitioned data set. A volume label exists at the head of the direct access volume, and identifies this direct access volume. The address of a VTOC (volume table of contents) area 52 is recorded by the volume label. It serves to manage a plurality of data sets on the direct access volume. In the VTOC area 52, there is the address of a directory 53 for managing the partitioned data sets. The directory 53 contains the names of members registered and the addresses of the members. Organization information 54 exists as one of the partitioned data sets. The organization information items for the respective online jobs are divided according to the specifications of the direct access volume and then recorded, and identifiers EOF (end of file) 55 indicating the separations of the member are attached before and behind each organization information item.

Figure 6:
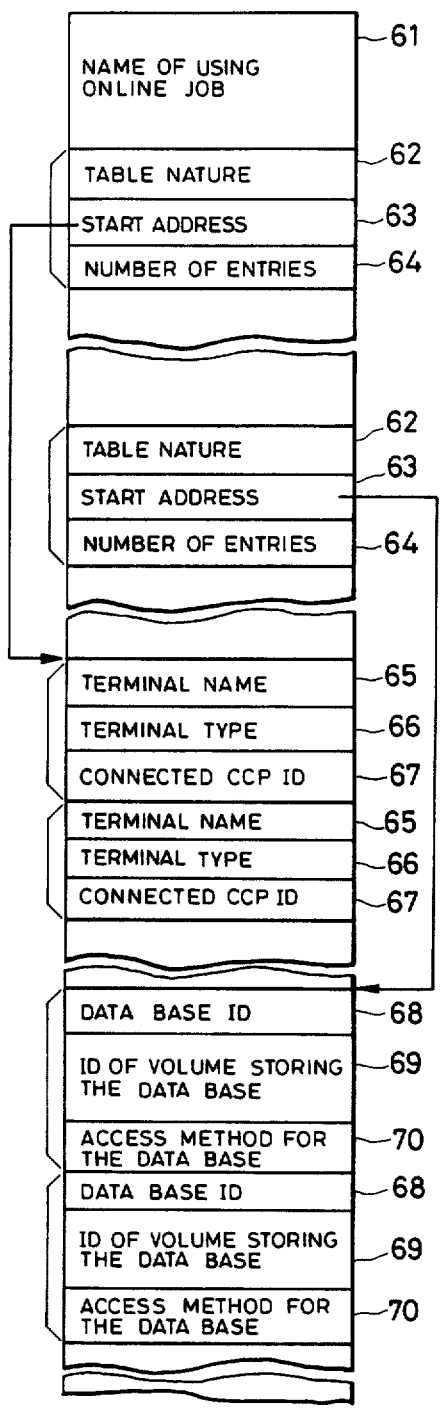
FIG. 6 is a detailed diagram of an organization information record.

FIG. 6 shows a practicable example of the organization information 54. The name 61 of an online job to use the information is stored in a head area which is pointed to by the directory 53. Numerals 62-64 designate control information items for a table to be described below. Here, the organization information is assumed to contain information items which indicate terminal devices and data bases used for the online job concerned. Numerals 65-67 designate the table indicative of the used terminal device, while numerals 68-70 designate the table indicative of the used data base. The table nature 62 is information for specifying, for example, either a table for the terminal device or a table for the data base, the address 63 indicates the stored position of the table, and the information 64 indicates the number of entries of the table. The table for the terminal device stores a set consisting of the terminal name 65, the terminal type 66 and the identifier 67 of a connected CCP, for each of the used terminal devices. The table for the data base stores the data base identifier 68, the identifier 69 of the volume storing the data base, and the method 70 of access to the data base, for each of the used data bases.

Figure 3:
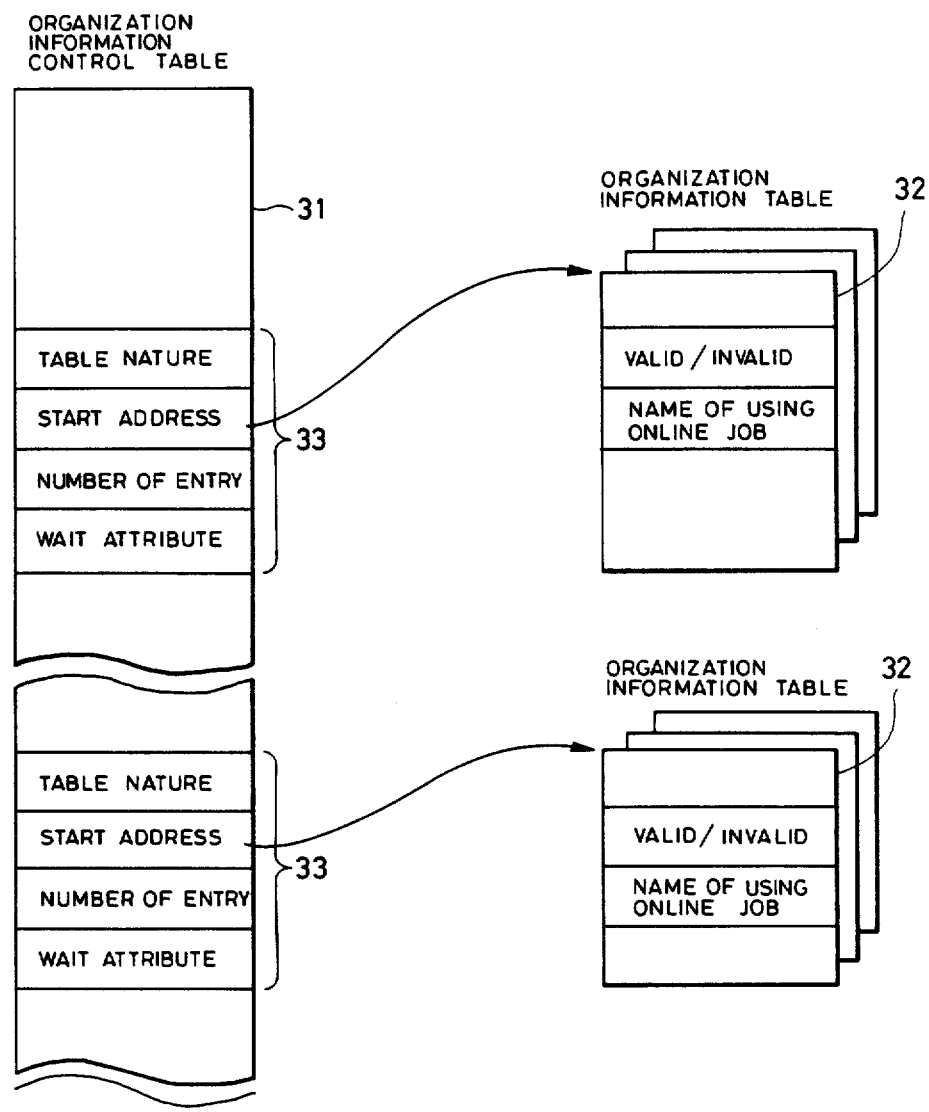
FIG. 3 is a diagram showing organization information in each online computer and the standby computer.

When the online job A at numeral 112 is activated, it reads out the organization information from the organization information file 16 and generates tables 31 and 32 as shown in FIG. 3 within a main memory included in the online computer 11. The same applies to the online job B at numeral 122. The organization information control table 31 has organization information table control information 33. The organization information table control information 33 contains a table nature, the head address of table entries, the number of the entries, and a wait attribute in relation to the organization information table 32. The wait attribute is information on whether or not the validating or invalidating control of the organization information is needed at the failure of the online job. The organization information table 32 contains for each entry, information as to whether or not the entry is valid, and the name of the online job to use the entry. Regarding the organization information in the case of the embodiment in FIG. 1, several tables are presumed as the table natures. For example, they are a table for managing data bases and a table for managing terminal systems. The plurality of terminal systems are used or not, depending upon the online jobs, so that they need to be controlled valid or invalid for wait jobs as will be stated later. The table for controlling the terminal systems has entries for the respective terminal systems 141-145, and the initial value of each of the entries is so set that the entry is valid. In the entries of the terminal systems 141-143, the name of the online job 1 is set as the name of the online job to use the system, while in the entries of the terminal systems 144 and 145, the name of the online job 2 is set as the name of the online job to use the system.

When the online job A at numeral 112 has generated the tables in FIG. 3, it performs a process of starting the use of the terminal systems 141, 142 and 143 and the data base 15 and starts an online process. Likewise, when the online job B at numeral 122 has been activated, it reads out the organization information from the organization information file 16, and it performs a process of starting the use of the terminal systems 144 and 145 and the data base 15 and starts an online process. When activated, a wait job 132 reads out the organization information items of the online jobs A and B from the organization information file 16, and it generates the tables in FIG. 3 on the basis of the information of the logical sum of the above information items. It also performs a process of starting the use of the terminal systems and the data base, and then waits. The failure of the online job A or the online job B is detected by either of the following methods (1) and (2), in which the failure of the online job A shall be exemplified:

(1) When the online job A at numeral 112 has failed, this online job itself applies an interrupt to the control program 111, which communicates with the control program 131 through the system-to-system communication path 17.

(2) The online job writes the information items of time etc. into a specific memory area 20 every fixed time interval, while the control program reads the contents of the specific memory area 20 every fixed time interval. When the contents stop changing, an online program decides that the online job has failed. When, in the architecture of FIG. 1, the control program 111 detects that the writing by the online job A at numeral 112 has ceased, the failure of this online job A is communicated to the control program 131 through the bus 17.

Although the online jobs A and B have different system organization, they perform similar processes (banking online processes).

Figure 2:
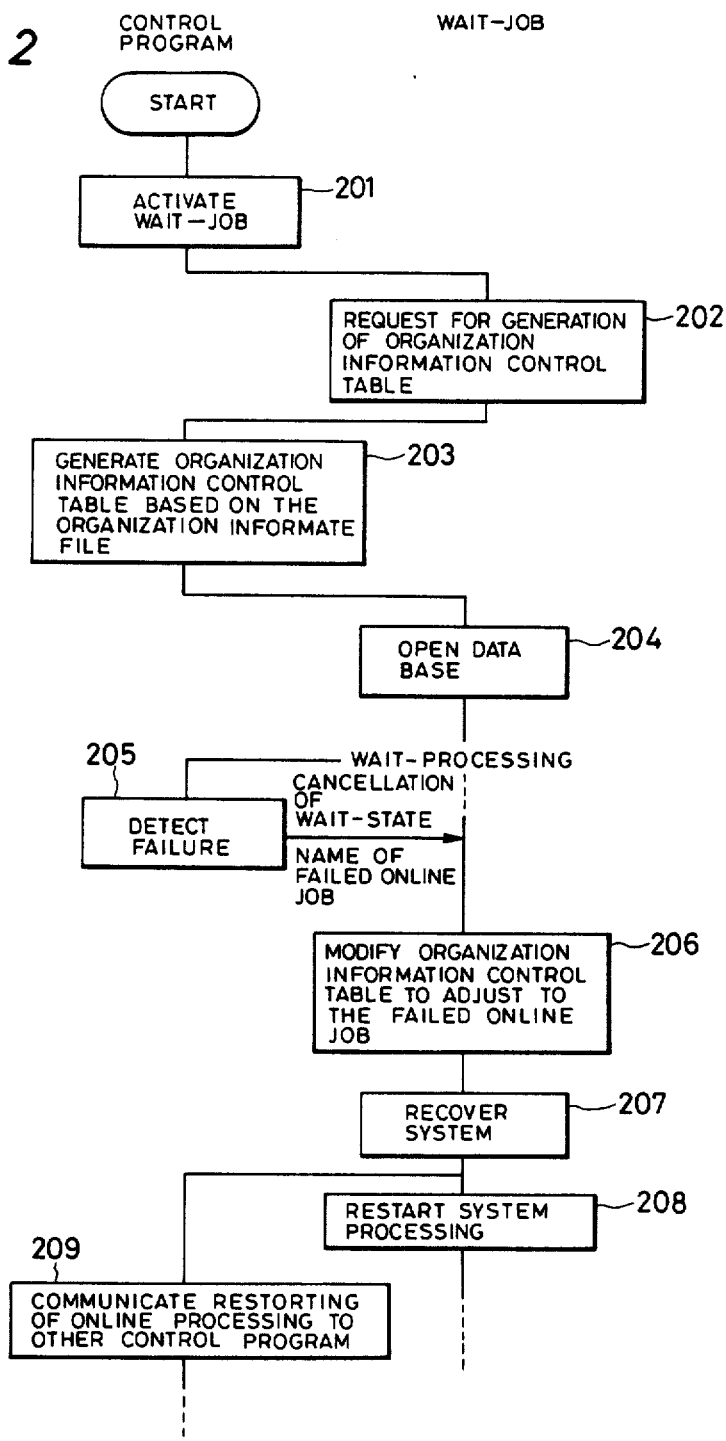
FIG. 2 is a flow chart of the processes of the control program and wait job of a standby computer in FIG. 1.

As illustrated in FIG. 2, the control program 131 in the standby computer 13 activates the wait job 132 (step 201). The wait job 132 requests the control program 131 to generate the organization information control table 31 and the organization information table 32 (step 202). In conformity with the request, the control program 131 generates these tables (step 203). Concretely, the organization information items of the online jobs A and B are read out from the organization information file 16 and have their logical sum taken, and the organization information control table 31 and the organization information table 32 are generated as to the logical sum as in the online job. Subsequently, a process of opening the data base is executed (step 204). Then, the wait job 132 falls into a wait state.

The detection of the failure of the online job (step 205) is performed in such a way that the occurrence of the failure is communicated from the control program 111 or 121 of the online computer 11 or 12 to the control program 131 of the standby computer 13 through the bus 17, or that the control program 13 does not receive within a fixed time interval the communication of an errorless operation which is given every fixed time interval.

When the failure has been detected, the wait state of the wait job is canceled, and the identifier of the failed online job (the name of the online job) is reported to the wait job.

In a case where the online job A has failed by way of example, the wait job invalidates information on the system architectures of the terminal systems 144 and 145 which only the online job B can use. In a case where the online job B has failed, the wait job invalidates information on the system architectures of the terminal systems 141, 142 and 143 which only the online job A can use (step 206). Thereafter, in order to keep consistency as the data of the online system, a system recovery process such as the conclusion of a process which was being executed at the time of the failure is performed (step 207). After the recovery of the system, the change-over of the computer systems is communicated to the terminal systems through the CCP, and the online operation is restarted (step 208).

The control program 131 waits for the completion of the system recovery process of the wait job having communicated the failure of the online job, and after the completion, it communicates the restart of the online operation to the control program of the other computer system (step 209).

The wait job 132 carries out online transactions similar to those of the online jobs A and B, and when it has its organization information conformed to that of the failed online job, it can continue the online transactions in place of the failed online job.

Figure 4:
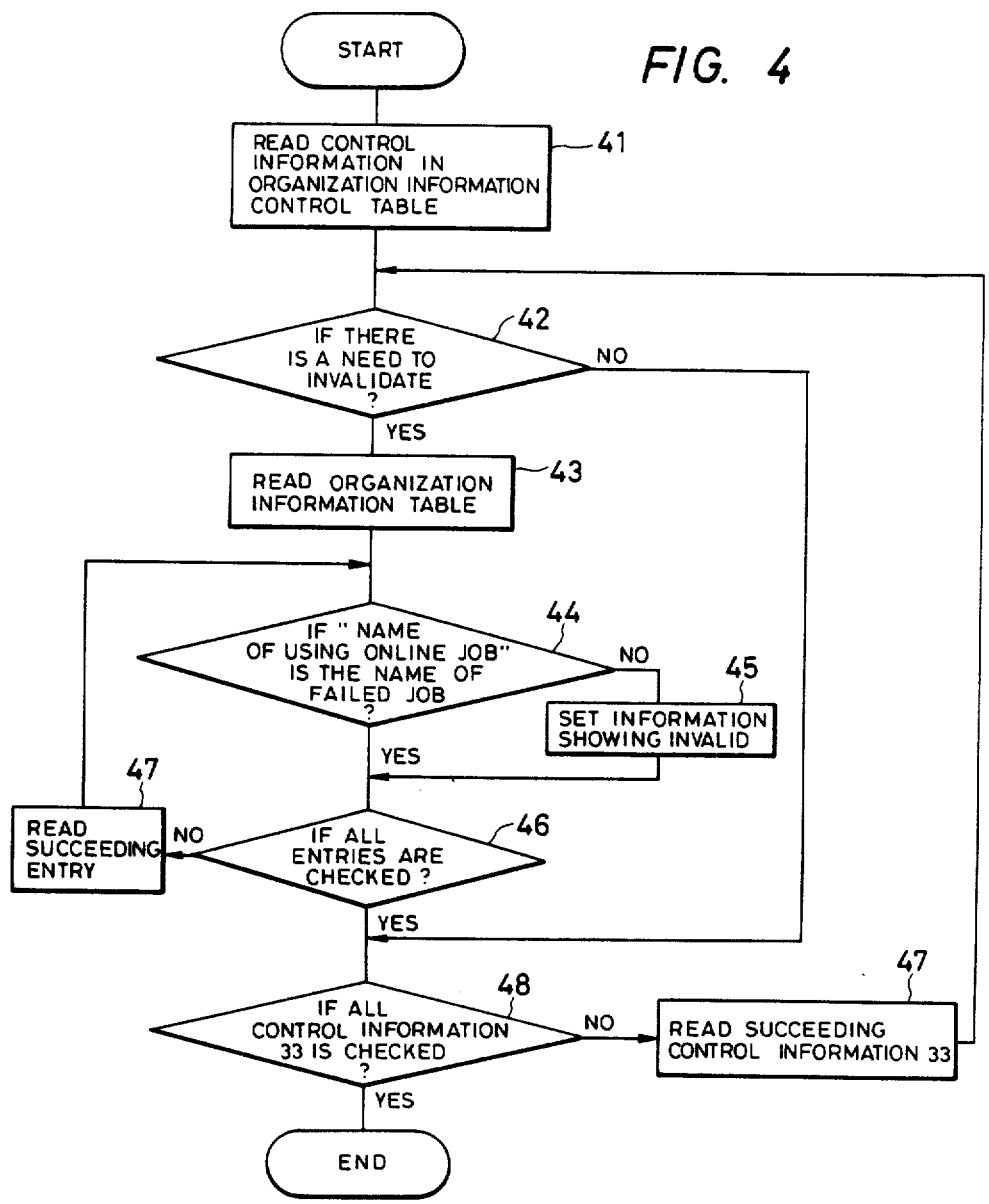
FIG. 4 is a flow chart of an organization information control based on the wait job.

FIG. 4 shows the details of the step 206 in FIG. 2. When the occurrence of the failure has been detected, the control information 33 in the organization information control table 31 is read (step 41), and whether or not the table needs to be invalidated is checked according to the propriety of use indicated for each online job by the wait attribute (step 42). The invalidation is necessary because the terminal devices have different connected states for the individual online jobs as described before. In case of the table which needs to be invalidated, the organization information table 32 is read on the basis of the "head address" in the control information 33 of the organization information control table 31 (step 43). If the name of a using online job in each entry agrees with the name of a failed online job, that is, if the using online job is the failed online job, is checked (step 44). When the online jobs differ, information indicating "invalid" is set in an entry (step 45). Using the "number of entries," whether or not all the entries have been checked is checked (step 46). If all the entries have not been checked, the next entry address is searched in order to process the next entry (step 47). Whether or not all the items of control information 33 have been checked, is checked (step 48). If all the items have not been checked, the next items of organization information table control information 33 is searched (step 49), whereupon the process is repeated. In the subsequent processing, an entry is neglected when the "invalid" information is set therein.

The same organization information table as that of the failed online job is generated by the above processes.

According to the present invention, the number of wait jobs for failures in the case where a plurality of online jobs exist can be reduced. This brings forth the effect that the resources of a data processing system to be used by the wait jobs, such as memories, CPU's and magnetic disk devices, can be curtailed, so an efficient system recovery can be attained.

We claim:

1. In a computer system wherein a plurality of processors are disposed, a plurality of jobs which have a system organization differing from one another respectively perform similar processes, and organization information items which are referred to by respective ones of the plurality of jobs and which express a system organization for the processes performed by the jobs are provided, a system recovery method comprising the steps of:

providing a wait job which is executed by one of said plurality of processors and which waits in an executable state, and wait-job organization information which is referred to by said wait job and which is a logical sum of said organization information items referred to by said respective ones of the plurality of jobs;

responding to detection of a failure of one of said plurality of jobs to retain as valid only the organization information items which are expressive of system architecture of the detected failed job within said wait-job organization information, the failure preventing the detected failed job from performing a process which was to be performed by the detected failed job; and causing said wait job to perform the process which was to be performed by the detected failed job.

2. A system recovery method as defined in claim 1, said computer system further comprising terminal devices which are connected to at least one of said plurality of processors, and said organization information items containing information which specifies a terminal device for processing of a pertinent job;

wherein the system recovery method further comprises the step of:

invalidating organization information items expressive of terminal devices other than a terminal device used for processing said detected failed job within said wait-job organization information.

3. A system recovery method as defined in claim 1, said computer system including an organization information file which stores all organization information items of said plurality of jobs;

wherein the system recovery method further comprises the step of:

reading said organization information file and generating a logical sum of read organization information items.

4. A system recovery method as defined in claim 2, said computer system having change-over means for changing-over processors to which said terminal devices are connected;

wherein the system recovery method further comprises the step of:

connecting a terminal device which is connected to a processor executing said failed job to a processor for executing said wait job by said change-over means.

* * * * *